(12) United States Patent
Follmar

(10) Patent No.: US 7,406,795 B1
(45) Date of Patent: Aug. 5, 2008

(54) FISHING ROD HOLDER APPARATUS AND METHOD

(76) Inventor: William L. Follmar, 9144 - 7th Ave. South, Seattle, WA (US) 98108

( * ) Notice: Subject to any disclaimer, the term of this patent is extended or adjusted under 35 U.S.C. 154(b) by 0 days.

(21) Appl. No.: 10/989,189

(22) Filed: Nov. 15, 2004

Related U.S. Application Data

(60) Provisional application No. 60/568,953, filed on May 7, 2004.

(51) Int. Cl.
*A01K 97/10* (2006.01)
(52) U.S. Cl. .................. 43/21.2; 248/534; 248/538
(58) Field of Classification Search .............. 43/21.2; 248/515, 534, 538
See application file for complete search history.

(56) References Cited

U.S. PATENT DOCUMENTS

| | | | | |
|---|---|---|---|---|
| 420,592 A * | 2/1890 | Dayton | .................. | 248/514 |
| 1,963,463 A * | 6/1934 | Hammer | .................. | 248/515 |
| 2,200,183 A * | 5/1940 | Legg | .................. | 248/538 |
| 2,599,160 A * | 6/1952 | Brauer | .................. | 248/515 |
| 2,626,770 A * | 1/1953 | Norman | .................. | 248/534 |
| 2,682,127 A * | 6/1954 | Binder | .................. | 43/21.2 |
| 2,887,287 A * | 5/1959 | Ross | .................. | 248/515 |
| 2,890,847 A | 6/1959 | Minton et al. | | |
| 2,949,269 A * | 8/1960 | Kimura | .................. | 248/515 |
| 3,792,829 A * | 2/1974 | Fickett | .................. | 248/534 |
| 4,198,775 A * | 4/1980 | Leisner | .................. | 43/21.2 |
| 4,245,419 A * | 1/1981 | McManus | .................. | 43/21.2 |
| 4,586,688 A * | 5/1986 | Hartman et al. | .............. | 248/538 |
| 4,635,390 A * | 1/1987 | Walters | .................. | 43/21.2 |
| 5,187,891 A | 2/1993 | Stanishewski | | |
| 5,231,785 A | 8/1993 | Roberts | | |
| 5,313,734 A | 5/1994 | Roberts | | |
| 5,975,479 A | 11/1999 | Suter | | |
| 6,269,584 B1 | 8/2001 | Peaschek | | |
| 6,487,813 B2 | 12/2002 | Baynard et al. | | |
| 6,561,471 B1 * | 5/2003 | Hawie | .................. | 248/201 |
| 6,571,507 B2 | 6/2003 | Elford | | |
| 6,584,723 B2 * | 7/2003 | Elmore | .................. | 43/4.5 |

* cited by examiner

*Primary Examiner*—Kurt Rowan
(74) *Attorney, Agent, or Firm*—Michael F. Hughes; Hughes Law Firm, PLLC

(57) ABSTRACT

A fishing rod retention device adapted to have a J-hook member rotate about a slotted region so when the fishing rod is in a stored location it is substantially retained therein and the fisherman with ease can remove the rod from a stored location to a removed position.

13 Claims, 13 Drawing Sheets

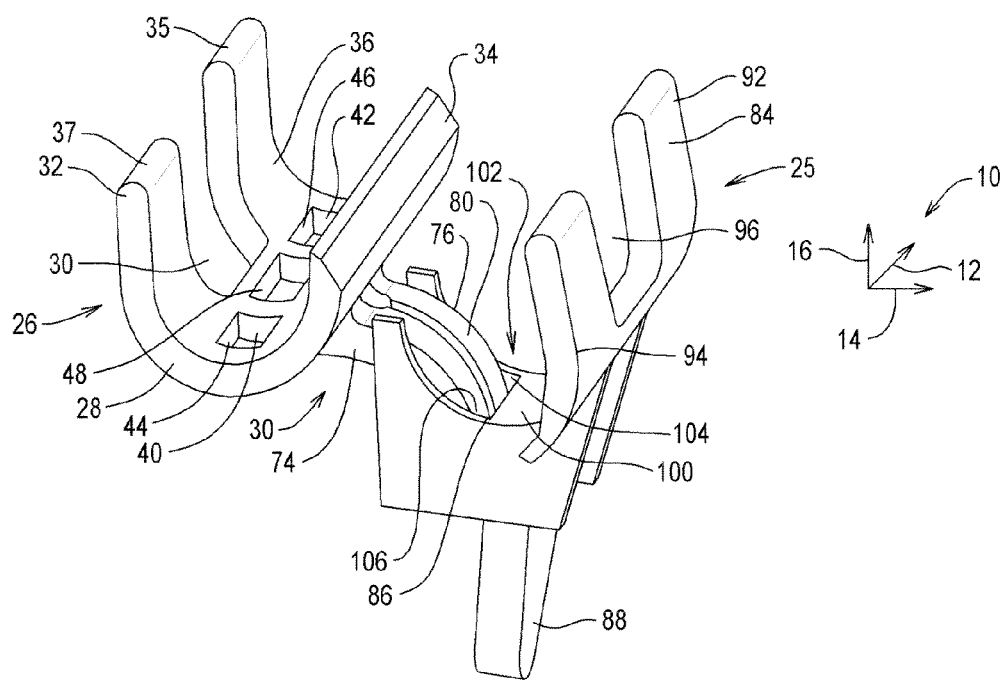

FISHING ROD HOLDER APPARATUS AND METHOD

RELATED APPLICATIONS

This application claims priority benefit of U.S. Ser. No. 60/568,953, filed May 7, 2004.

BACKGROUND OF THE INVENTION

Fishing rod holders are adapted in general to be mounted to water vessels or stationary platforms such as docks or the like. A fishing rod holder should have the function of positioning a fishing rod in a substantially secure orientation that is adapted to handle the loads of a fish that hooks to the bait of the fishing line attached to the rod in a well-known and conventional manner. Further, the fishing rod should be reasonably accessible, in that if the bait of the fishing pole is taken by fish, oftentimes the fisherman will want to grab the rod and remove it from its stored location to a removed position of the fishing pole where the fisherman is actively and dynamically reeling in his catch.

It is generally desirable to rest a fishing pole in a stored location that is reasonably secure, where the fisherman has confidence that a bite on the line from a fish will not pull their whole fishing rod assembly overboard; this can account for a costly loss of equipment as well as a ruined outing. Further, the fish must endure its final days of living with a hook at its mouth that is attached to a relatively large mass that partially mobilizes and perhaps causes a painful death to the fish. It is generally desirable to have a fishing rod in a stored location when the fisherman is tired and fatigued of holding the rod or while he or she is trolling. Further, while fishing with more than one rod, the fisherman must store the nonactive rod in a fishing rod retention type device.

Prior art fishing rod holders have generally failed to meet the criteria of positioning a fishing rod in a stored location that is substantially secure from removal upon the load exerted thereon by a fish at the forward end portion of a pole and having easy and convenient access to the fishing rod for removal from the stored location by the fisherman on quick demand when a bite is on the line of the fishing rod line. There are numerous advantages to quickly removing a fishing rod such as when fishing from a drift boat where tree limbs and other objects threaten to break the fishing rod while in the stored position; it is desirable for the fisherman to quickly and effectively remove the fishing rod when it is in such a perilous position. Therefore, quick and easy removal of a fishing rod in a timely fashion is desired, so as to make it possible for the rod holder to fight a fish quickly and effectively with minimal struggle and resistance. In one form, a fishing rod holder with one moving piece with an offset rotation axis allows for significant advantages.

In one form, the fishing rod retention assembly allows for placing of the rod further out over the gunnel of a boat. Further, the removal of the rod can be accomplished to the fisherman's desired angle of pull whether it be from leftward, rightward or upward directions. This variety of movement for releasing the fishing rod from the stored location allows for minimal training and adapting to the fishing rod retention assembly by the user, which eases the frustration that is present with prior art devices. Further, in one form the fisherman can immediately pull the rod from the holder with either one hand or two hands without any significant amount of force applied thereto. However, the rod remains intact securely in a stored location when the force of a fish on the line at the forward end portion of the fishing rod is applied to the fishing rod.

In the particular application of fishing known as downrigging, oftentimes careful attention must be applied when removing a fishing rod from its holder so as to not trip the downrigging ball which would require resetting the release and fishing rod. The fishing rod retention assembly as described below is particularly conducive for this application. Generally, setting up a downrigger is often problematic because the rod must be maintained in a position to keep various lines from entangling each other. When a downrigger line is tripped, the downrigger may be released. The fishing rod retention assembly described below allows for easy placement of the fishing rod therein to prevent tangling of such lines.

When a fisherman uses barbless hooks, hooking and landing a fish is far more difficult. In this application, once the fisherman hooks a fish, he or she must maintain constant tension upon the fishing line after setting the hook or the fish can potentially get away. The quick release design of the fishing rod retention assembly described below is conducive for maintaining constant tension upon the fishing line.

The fishing rod retention assembly allows for a very quick method to secure a rod in a stored location, and also a very quick method of retrieving the rod to a removed active location of the fishing rod. The minimal amount of movement and resistance allows for very easy retrieval, and even when employing the lock assembly described below, the removal process is extremely fast and does not require "getting used to" the device. Because such a minimal amount of movement is required to position the rod from the stored location within the fishing rod assembly to a removed position, there is minimal force and displacement upon the line which is particularly advantageous when downrigging. To remove the rod from the fishing rod retention assembly the fishing rod is repositioned in a manner substantially orthogonal to the central axis of the fishing rod. Further, to position the fishing rod within the J-hook assembly, the fisherman needs only to position the fishing rod substantially downwardly with slight lateral movement where the fishing rod is repositioned in a manner that is orthogonal to the central axis. This can be accomplished with one hand, keeping one hand free to either hold the line away from rod guides when using a downrigger, or to rest on the tiller handle or the steering wheel of the boat.

SUMMARY

In general the apparatus is a fishing rod retention assembly having a longitudinal axis that substantially extends along the length of a fishing rod and a lateral axis. The assembly is adapted to be attached to a stationary platform or a boat, with a reel seat area of a fishing rod mounted therein. The fishing rod has a forward region that occasionally has a load exerted thereon, such as the load exerted from a fish on the line of the fishing rod. The fishing rod retention member has a retention member adapted to be adjustably attached to the stationary platform or boat, and comprising a longitudinally forward and a rearward surface that partially defines a receiving slot. The assembly further has a J-member that comprises a retention bracket comprising a lower retention member and an upper retention member and has a central elongated chamber region adapted to mount the reel seat area of a fishing rod therein. The J-member further has a curve attachment fixedly attached to the retention bracket, the curved attachment having a longitudinally rearward surface and a longitudinally forward surface. In the lateral direction the J-member has first and second surfaces that are curved about a longitudinal axis. The center of curvature of the first and second surfaces is arranged to have center of curvatures in a first lateral area of the curve attachment.

The J-member is adapted to be positioned in the receiving slot of the retention member and have an open position whereby the elongated chamber region provides for access therein. The J-member is adapted to be repositioned downwardly and laterally with the curve attachment extending through the receiving slot in a closed position to retain a fishing rod therein. The frictional force between either the longitudinally rearward surface or the longitudinally forward surface of the curve attachment with the longitudinally forward and rearward surfaces of the retention member locks the fishing rod therein when a load is placed on the forward portion of the fishing rod.

BRIEF DESCRIPTION OF THE DRAWINGS

FIG. 1 shows an orthogonal view of the fishing rod retention assembly where the J-member is in an open position;

FIG. 2 shows a fishing rod retention assembly with a fishing rod retained therein;

EMBODIMENTS OF THE PRESENT INVENTION

There will first be a description of the general environment for the area of use of the fishing rod retention assembly 20, followed by a specific discussion of the components and attributes of an embodiment of the fishing rod retention assembly. Thereafter a method of use of the fishing rod retention assembly will be discussed.

Figure 3:
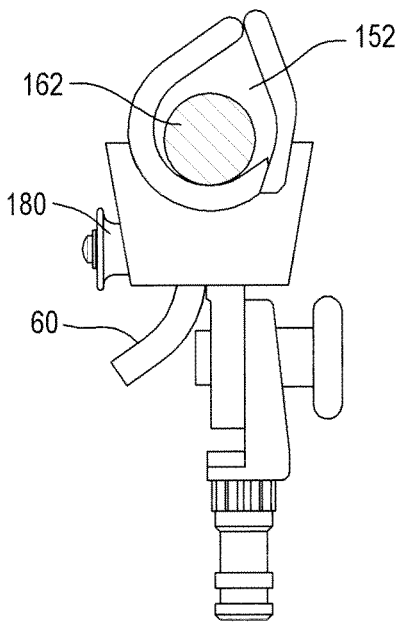
FIG. 3 is a front view of the fishing rod retention assembly with a cross-sectional view of a fishing rod retained therein.
Figure 4:
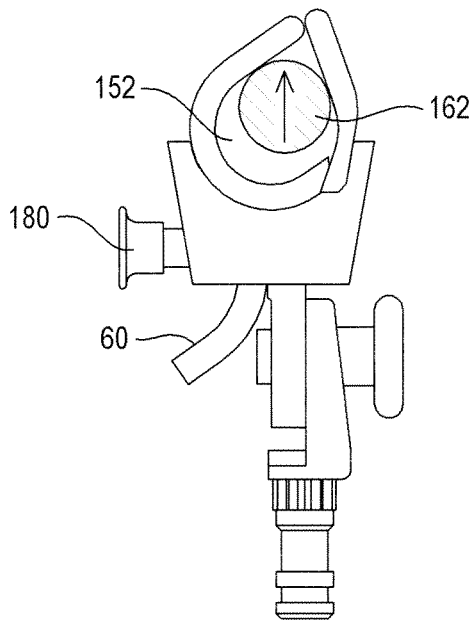
FIG. 4 shows a transition state with the fishing rod repositioned in a vertical direction from within the rod retention conduit of the fishing rod retention assembly.
Figure 8:
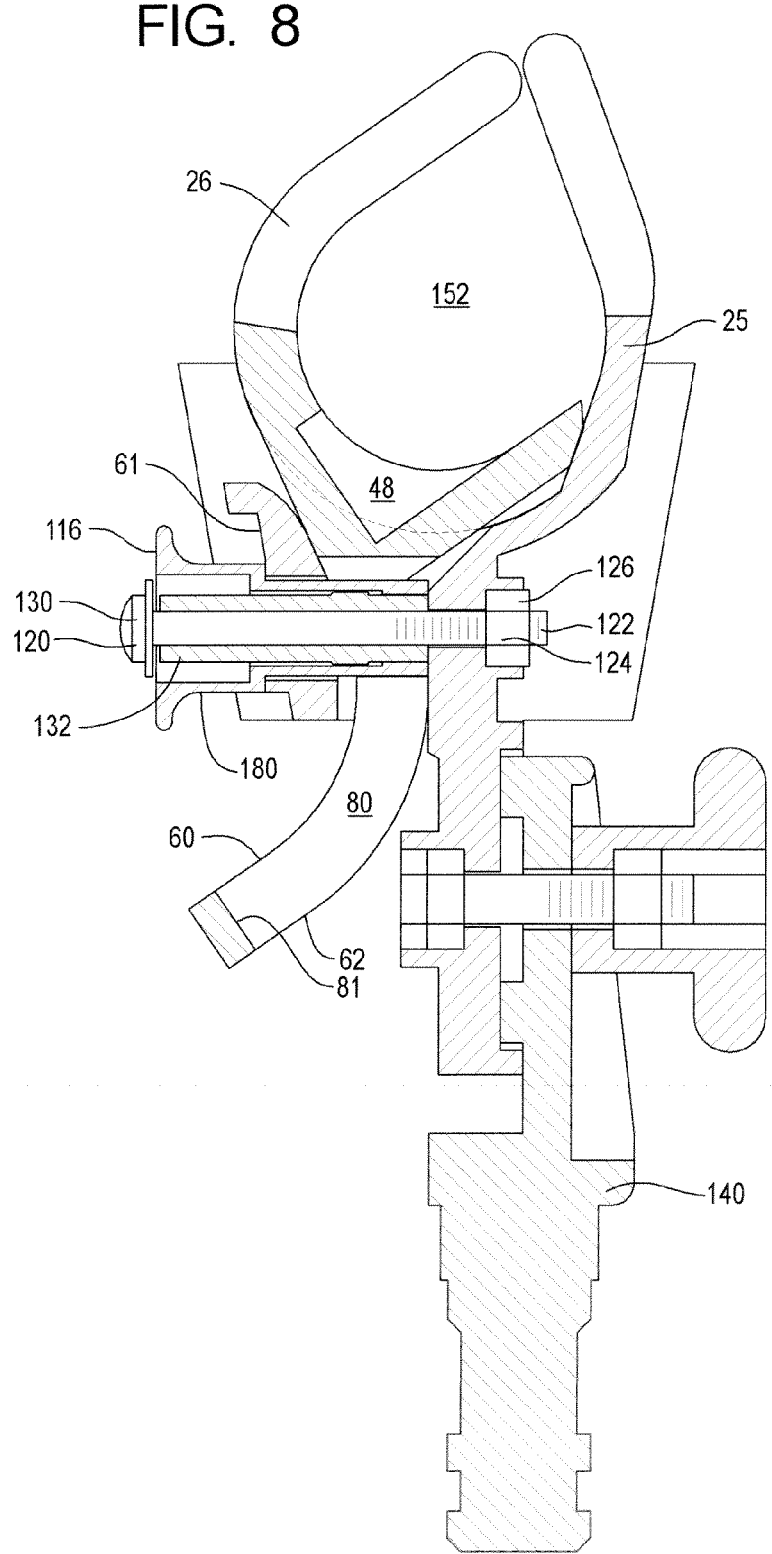
FIG. 8 is a partial sectional view of the fishing rod retention assembly illustrating the rod locking mechanism.

Initially referring to FIG. 1, an axes system 10 is defined that correlates to the fishing rod retention assembly 20. A longitudinal axis 12 is generally defined by the center axis of the rod retention conduit 152 described below. A lateral axis 14 as shown in FIGS. 3 and 8 is defined as a lateral direction. A substantially vertical axis 16 is orthogonal to the longitudinal axis 12 and the lateral axis 14. It should be noted that in practice the substantially vertical axis 16 is not perfectly vertical and aligned with the flux field of gravity, but rather, at an angle tilted rearwardly toward the boat or stationary platform (such as a fishing platform) as shown in FIG. 2. It should be noted that the axis system is relative to the upper portion of the fishing rod retention assembly 20 and hence moves therewith.

Figure 9:
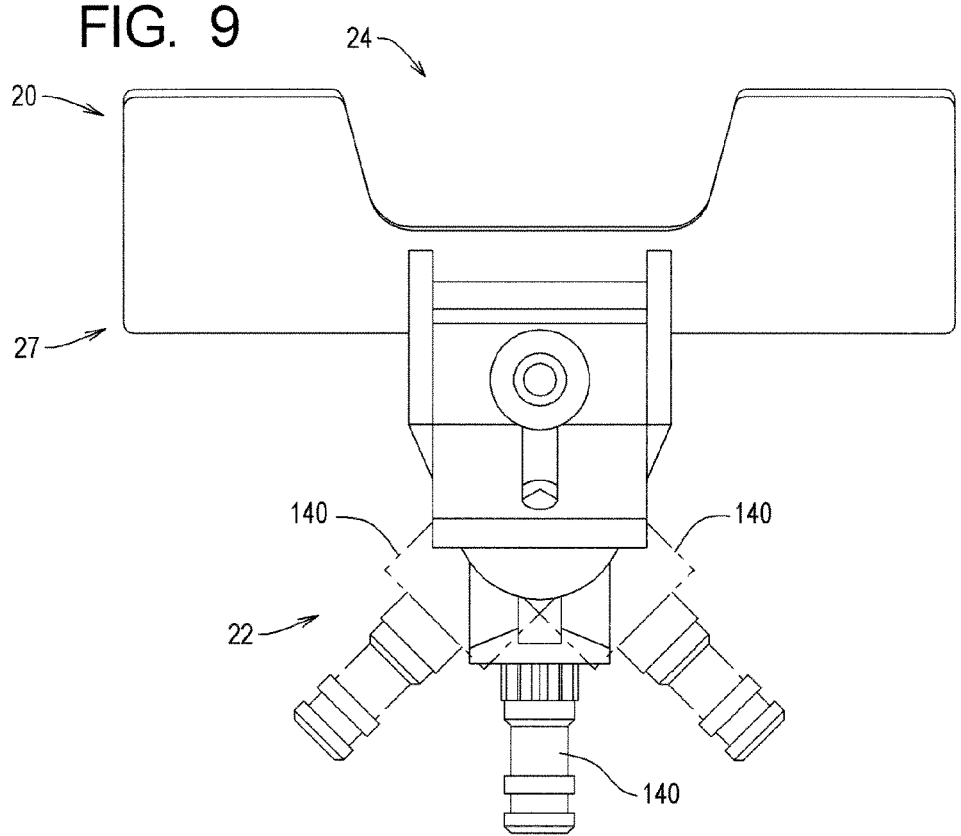
FIG. 9 is a side view of the fishing rod retention assembly illustrating the mobility of the base mount with respect to the mount extension.

As shown in FIG. 9, the fishing rod retention assembly 20 is generally comprised of a base mounting system 22 and a rod retention system 24. The rod retention system 24 as shown in FIG. 1 comprises a J-member 26. In general, the J-member 26 comprises a retention bracket 28 and a curve attachment 30. The retention bracket 28 comprises an upper retention member 32 and a lower retention member 34. The upper and lower retention members comprise the rotating retention surface 36 that is adapted to engage the reel seat area 164 of a fishing rod 162 described below with reference to FIGS. 3-7.

The retention bracket 28 further comprises in one form surfaces 40 and 42 that are adapted to define openings 44 and 46 as shown in FIG. 1. These openings allow for a lighter weight J-member 26. As shown in FIG. 8, a pocket 48 is defined as a recessed region. The pocket 48 is particularly advantageous for engaging an extension 165 (see FIG. 7) of a fishing rod that is opposite to the reel. Further, the pocket is positioned in between the openings 44 and 46 and directly above the curve attachment 30. Therefore to facilitate a substantially uniform thickness for plastic injection molding, providing a recessed region for the pocket allows for a better molding process and cooling procedure to properly plastic inject the components, which is one form of making the fishing rod retention assembly 20.

Figure 21:
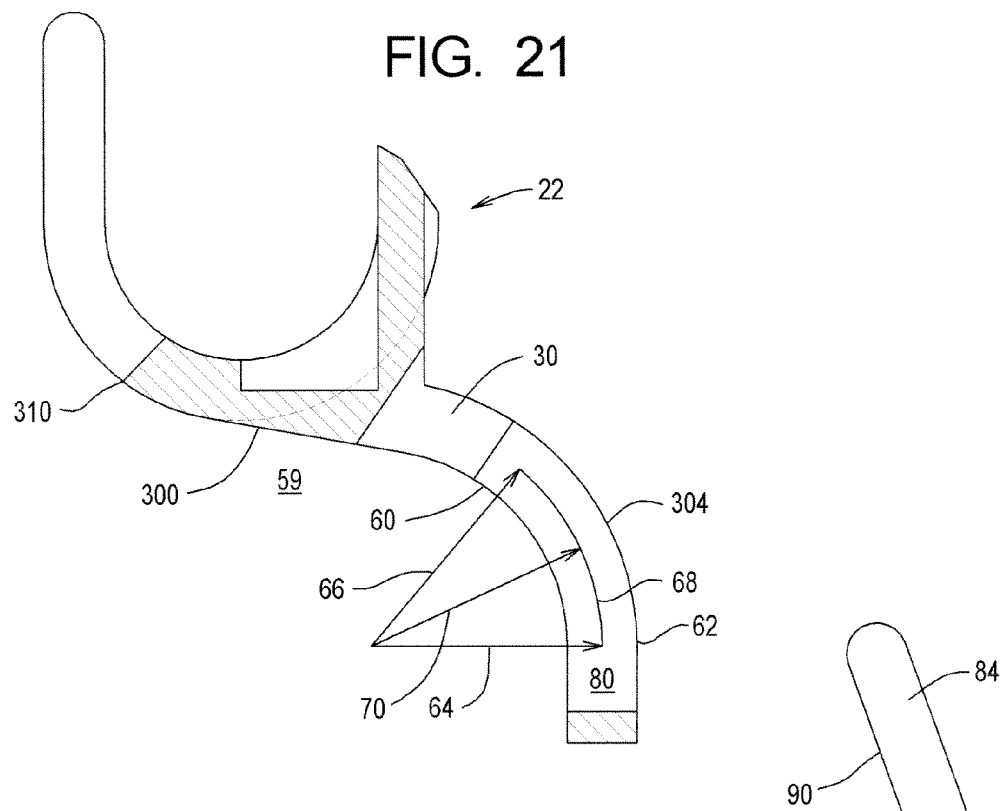
FIG. 21 is a partial sectional view of the J-member.
Figure 22:
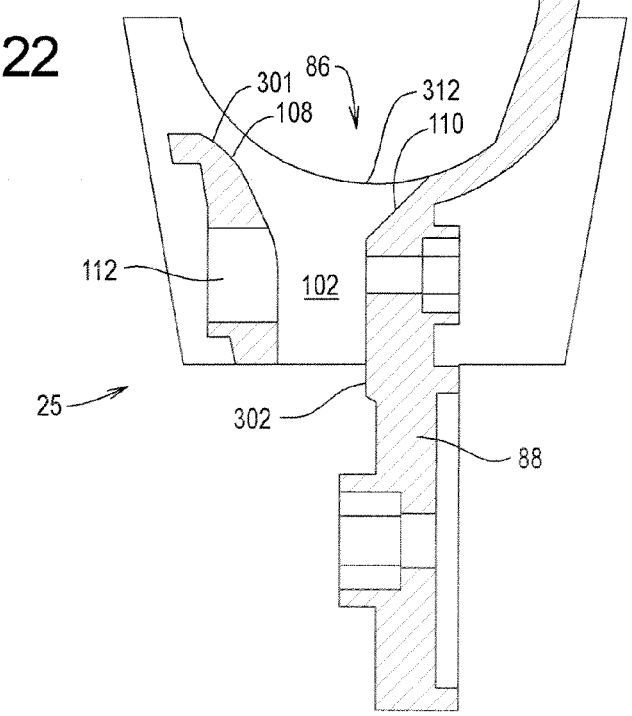
FIG. 22 is a partial sectional view of the retention member.

Also shown in FIG. 8, the curve attachment 30 has a first curve surface 60 and a second curve surface 62. As shown in FIGS. 21 and 22, the J-member 26 is shown removed from the retention member 25 along the longitudinal axis. The first curve surface 60 has a radius of curvature 64 and the second curve surface 62 has a radius of curvature 66. Of course the surfaces 60 and 62 need not be perfect partial cylindrical surfaces and the center of radii for the various localized portions of the first and second surfaces 60 and 62 can change with respect to the radial location along the curve attachment 30. However, in one form the radius 64 is approximately 1.25 inches and the radius 66 is approximately 1.5 inches for a mean average radius of 1.375. Of course, these values in practice can change within the range of 1 inch and 1.25 inches for radii 64 and 66 respectively up to 3 inches and 3.25 inches for radii 64 and 66 respectively. The radius 65 represents a mean radius of curvature of the curved attachment 30. If the cross-sectional thickness of the curve attachment 30 is thicker, the difference between the radii 64 and 66 will change accordingly. In the broader scope, the radii 64 and 60 can be in the general range of 6 inches if less rotation of the J-member 26 and more vertical displacement of the same is desired. An alternative method for defining the curvature of the curve attachment 30 is to define a central axis 68 having a radius 70 where the radius 70 is a mean average radius for a certain radial distance of the curve attachment 30, and is not limited to a fixed radius and fixed curvature therealong the radial distance of the curve attachment 30. Therefore, in general a range for the radius 70 can be between 1 inch and 3 inches and in the broader scope 0.5 inches to 10 inches. The center of curvatures 64 and 66 need not be concentric, but are located on the same first lateral portion of the curve attachment 30 as generally indicated at 59 in FIG. 21. The discussion below will describe the use of the curve attachment 30, and how the lack of a fixed pivot point allows for a more streamlined design and a desirable vertical and lateral movement of the fishing rod when being placed in the fishing rod retention assembly 20 and being removed therefrom.

Now referring back to FIG. 1, the J-member 26 further comprises a longitudinally rearward surface 74 and a longitudinally forward surface 76. The surfaces 60, 62, 74 and 76 are adapted to engage the receiving slot 102 described further below. As shown in FIG. 1, the J-member 26 further comprises a surface defining an adjustment slot 80 that is adapted to extend the vertical and lateral length along the curve attachment 30 substantially along the path of the center axis 68 that is shown in FIG. 21. The adjustment slot as shown in FIG. 8 has a lower surface 81 that is adapted engage the outer surface of the contracting mechanism 116 to prevent the J-member 26 from being fully extracted. The adjustment slot 80 is part of a rod locking mechanism 114 described below. As shown in FIG. 1, the upper retention member 32 comprises longitudinally forward and rearward portions 35 and 37. The portions 35 and 37 define a central opening 39 as adapted to allow portions of the reel 166 be positioned therein.

A rod retention conduit 152 is a longitudinally extending conduit defined by the retention member 25 and the retention bracket 28. More specifically, the rod retention conduit 152 is further defined by the retention surface 90 of the retention member 25 and the rotating retention surface 36 of the lower and upper retention extensions 34 and 32 respectively (which are a portion of the retention bracket 28).

Now referring to FIGS. 1 and 25, the retention member 25 in one form is a portion of the rod retention system 24 and the base mounting system 22 (see FIG. 1). In general, the retention member 25 comprises a stationary retention bracket 84, a J-member receiving portion 86 and a mount extension 88. The stationary retention bracket 84 comprises a retention surface 90. The retention surface 90 of the retention member 84 is adapted to cooperate with the retention bracket 28 to hold the reel seat area therein. The retention surface 90 can directly contact the reel seat area or alternatively indirectly contact at within interposed material. For example, a thin material can be attached to the end portion of the lower retention extension and flexibly attached thereto. Therefore when the J-member 26 is in a closed position the material would flex toward the first lateral direction and be biased by the retention surface of the retention member. Likewise, when the J-member 26 is in an open position, the thin material would relocate toward the second lateral direction or be sufficiently flexible to allow the fishing rod to be withdrawn therefrom to the fishing rod retention assembly 20.

Figure 5:
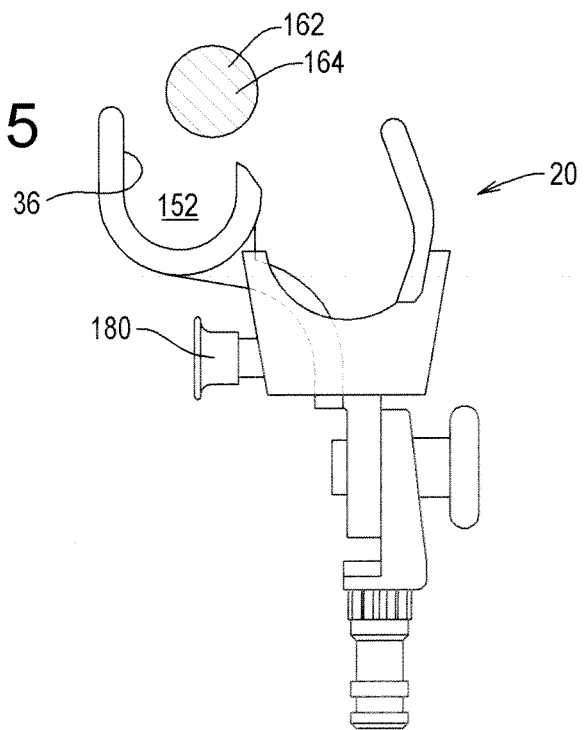
FIG. 5 shows the J-member in an open position with the fishing rod removed from the fishing rod retention assembly.
Figure 5A:
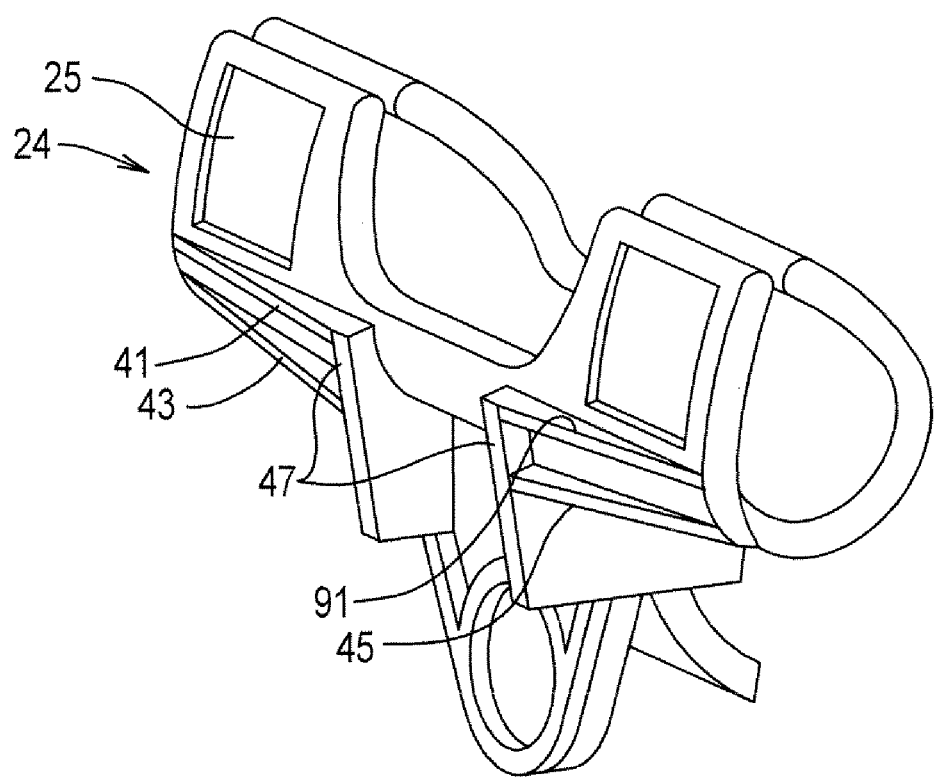

As shown in FIG. 5A, the retention member 25 comprises a fin reinforcement system 29 having fins 41 and 43. The fin reinforcement system has a longitudinally inward region that is fixedly engaged to a vertical fin 47. As shown in FIG. 5, the retention member 25 without the fin reinforcement system 29 has a more planar arrangement than, for example, the retention bracket 28 of the J-member 26. Therefore, in one form, it is desirable to have the fin system 29 to better support any movements acting upon the longitudinally forward and rearward portions of the retention member 25. The retention member has forward and rearward portions 92 and 94. The forward and rearward portions define a central open area 96.

Figure 17:
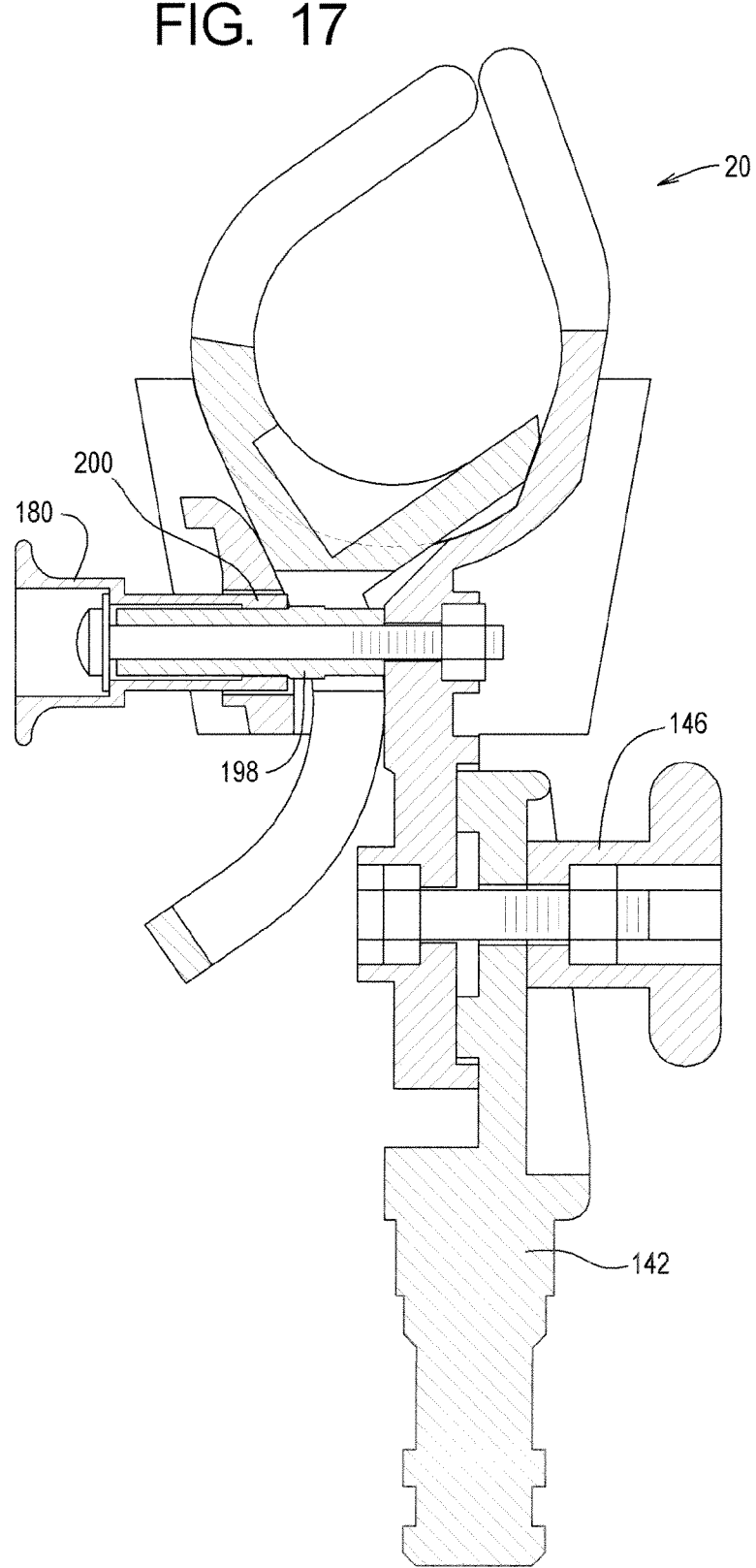
FIG. 17 shows a locking member of the rod locking mechanism in a fully retracted orientation where it is in a retracted retained position.
Figure 18:
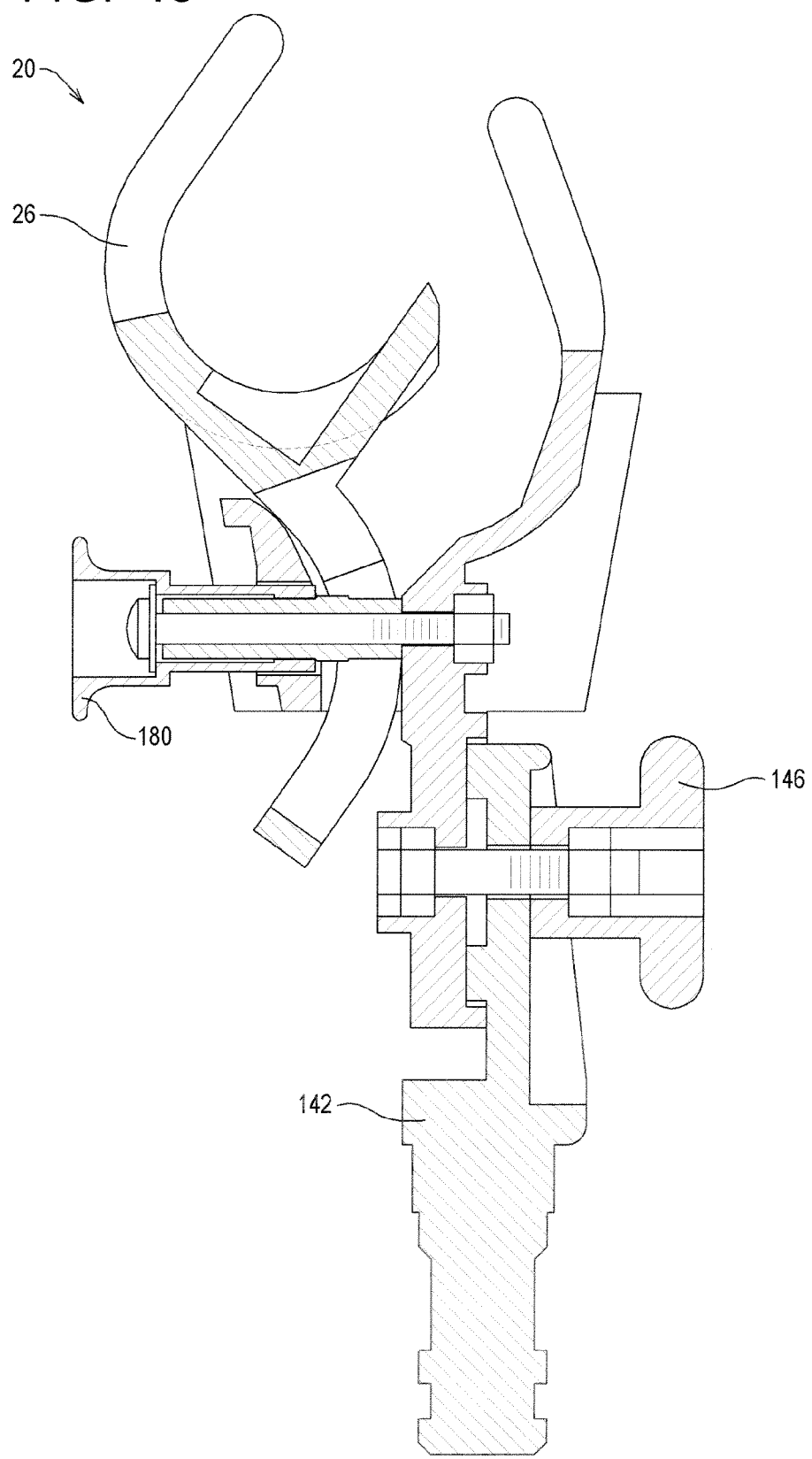
FIG. 18 shows the J-member extending to an open position.

Also shown in FIGS. 1 and 21, the J-member receiving portion 86 has a J-member retention bracket support surface 100 that is adapted to engage the outer surface of the retention bracket 28. Further, a surface defining a receiving slot 102 is provided having longitudinally forward and rearward surfaces 104 and 106 respectively and first and second lateral surfaces 108 and 110. The surfaces 108 and 110 are adapted to engage the curve surfaces 60 and 62 described above. Further, the longitudinal forward and rearward surfaces 104 and 106 are adapted to engage the surfaces 76 and 74 respectively whereas frictional engagement between the surfaces will occur when a movement about the lateral axis is imparted upon the J-member 26 described further below. In one form, the J-member receiving portion 86 provides a surface defining a laterally extending opening 112 that is a portion of the rod locking mechanism 114 as shown in FIGS. 8, 17 and 18.

Figure 7:
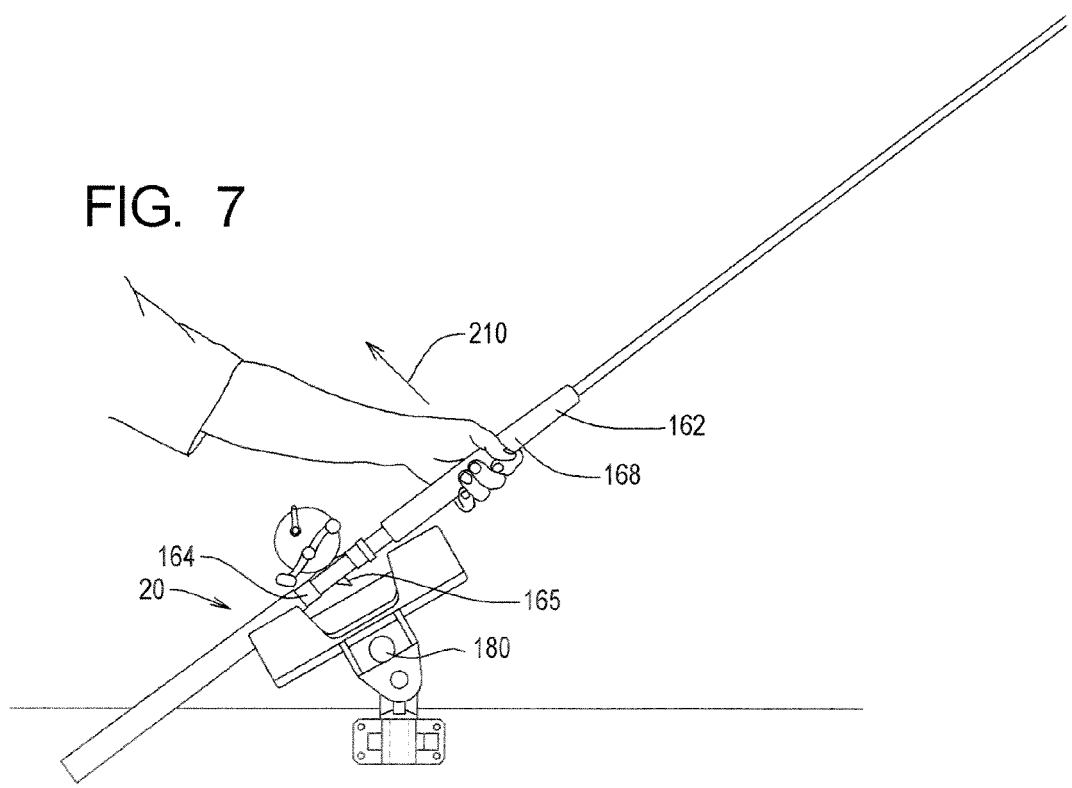
FIG. 7 shows the fisherman removing the fishing rod by exerting a partially vertical force thereon where the J-member repositions to an open position.

The rod locking mechanism is comprised of previous aforementioned components and regions of the fishing rod retention assembly 20 in one form. As shown in FIG. 1, the curve attachment 30 is adapted to be fitted into the receiving slot 102, and the contracting mechanism 116 that is slidably attached to the retention member is adapted to frictionally engage portions of the curve attachment 30 to portions of the receiving slot 102 to either fixedly position the J-member 26 to the retention member 25 or to have resistant engagement between the J-member 26 and the retention member 25. Resistant engagement is defined as allowing for rotation of the J-member 26 with respect to the retention member 25, such as that as shown in FIGS. 7 and 8, whereby the correct pull of the rod as described further herein will allow for a repositioning of the rod from FIG. 3 to the position as shown in FIG. 5 for withdrawal and in the reverse sequence for an insertion of the rod to the rod retention conduit 152 of the fishing rod retention assembly 20.

In one form, the contracting mechanism 116 is a bolt and nut arrangement whereby a bolt 120 is provided having a threaded portion 122 that is adapted to engage a threaded recess region 124 of a nut 126. A first lateral recess surface (not shown) can define an opening to engage the outer hexagonal surface of the nut 126 (or other engagement surface of the nut or like object), and by rotating the handle region 130 a forward surface 132 can directly engage the retainer 180. Of course a variety of arrangements for this rod locking mechanism 114 can occur near the J-member receiving portion 86; for example, a portion of the J-member receiving portion can be threaded correctly and the nut 126 would not be needed. The operating elements of the rod locking mechanism provide free or resistant engagement between the J-member 26 and the retention member 25, and in one form provide for fixedly positioning the J-member 26 with respect to the retention member 25 in situations where it is desired to rigidly lock the fishing pole therein. In this example, a quick release therefrom is not desired, and a lack of such is accepted to ensure that the pole will remain in a closed position.

Figure 12:
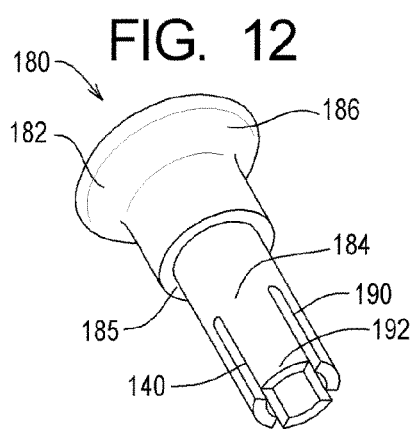
FIG. 12 is an isometric view of the locking member of the rod locking mechanism.
Figure 16:
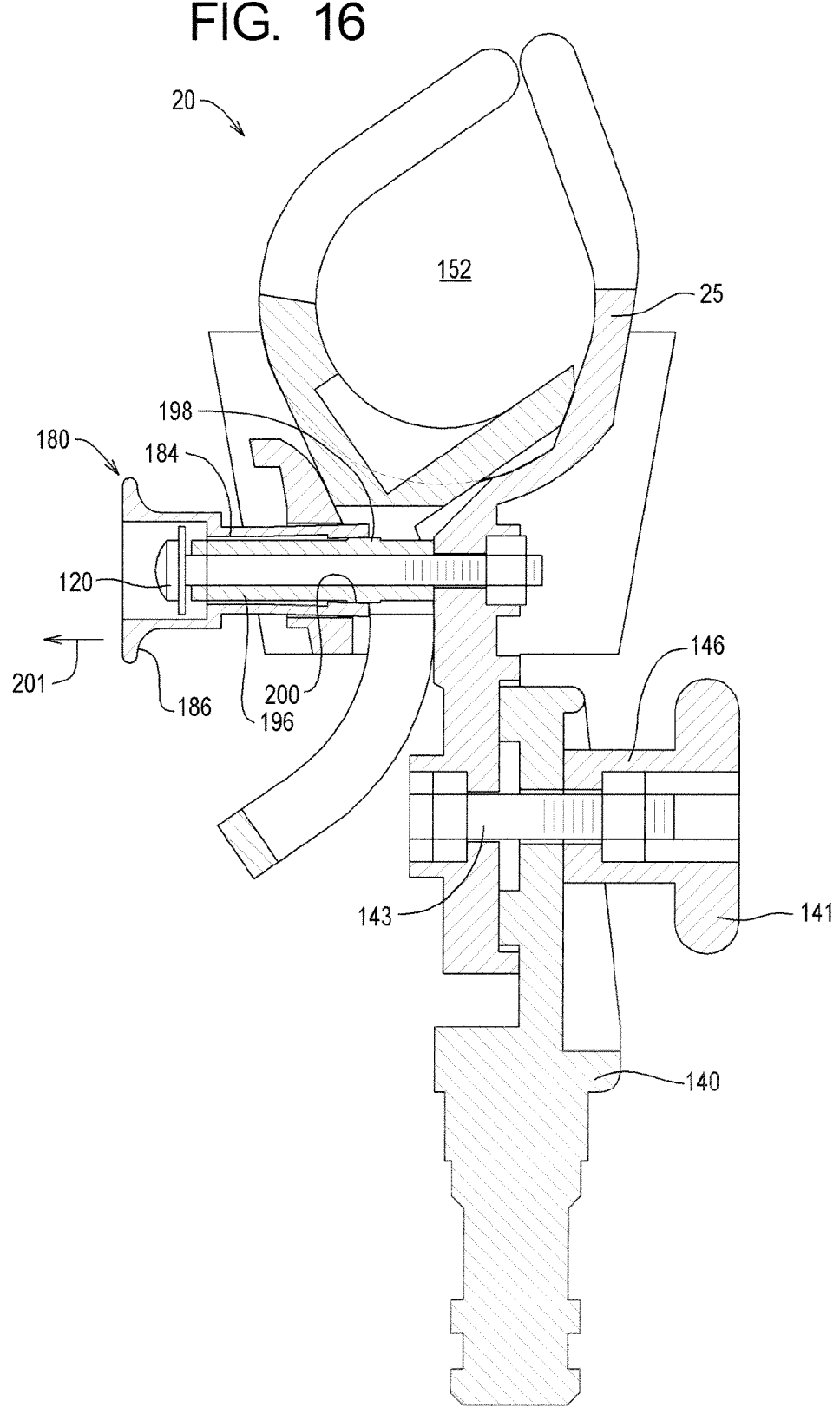
FIG. 16 is a partial cross-sectional view of the fishing rod retention assembly whereby the locking member is in a retracted position.

The retainer 180 as shown in FIG. 12 comprises a grasping region 182 and a central shaft region 184. The grasping region has a laterally inward surface 186 that is adapted to engage the fingers of a fisherman when manipulating the retainer 180 laterally inwardly and outwardly. The inward surface 188 is adapted to engage the surface 61 as indicated in FIG. 8. The central shaft region 184 comprises elongated slots 190 that provide tangential relief so the forward region 192 can extend radially inwardly and outwardly. As shown in FIG. 16, positioned on the anterior partial cylindrical cavity region of the central shaft region 184 is a member 196 that is adapted to be positioned around the bolt or similar structure 120. The outer surface of the member 196 as shown in FIG. 16 has an annular extension region 198 that is adapted to cooperate with the annular inward extension 200 of the retainer 180.

Figure 13:
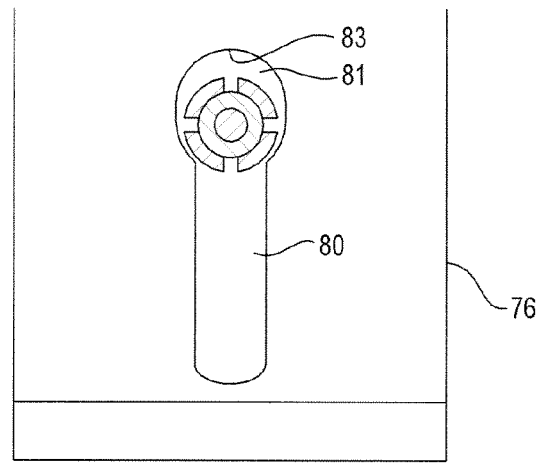
FIG. 13 is a front view of the locking mechanism that is extended through the upper portion of the adjustment slot of the J-member.
Figure 14:
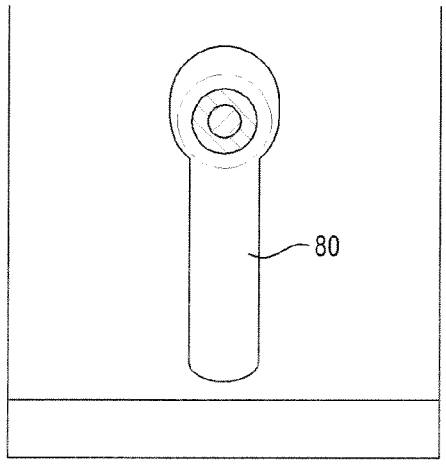
FIG. 14 shows a locking member in an extracted state whereby the outer surface is retracted from the narrow region.
Figure 15:
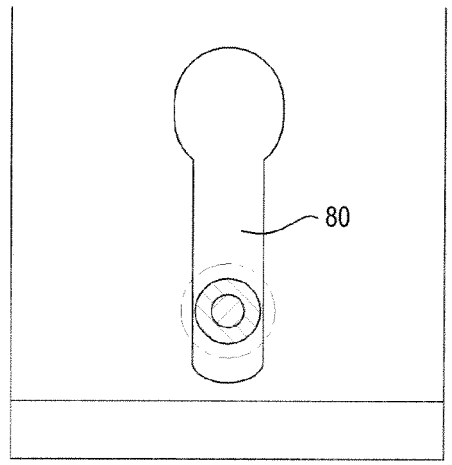
FIG. 15 shows the J-member in an open position whereby the outer surface of the locking member is engaging the narrow region of the adjustment slot.

As shown in FIG. 8, the retainer 180 is in a fully inserted position whereby the outer surface of the retainer 180 is engaged in the open region 81 defined by the upper portion of surface 83 that defines the slot 80 as shown in FIG. 13. This is a locked position, whereby a fishing rod retained therein would not be removed even if a vertical force were exerted upon the fishing rod. This orientation is desirable in situations such as very rough seas whereby a variety of inertial forces are acting upon the fishing rod, and the fisherman wants to be absolutely sure the fishing rod is locked in the rod retention conduit 152 as indicated in FIG. 8.

As indicated in FIG. 16, when a fisherman desires to orientate the fishing rod retention assembly 20 in a manner so that the fishing rod is only partially securely locked within the rod retention conduit 152, the fisherman engages the laterally inward surface 186 and repositions the retainer 180 in a direction as indicated by arrow 201, whereby the laterally inward portion of the annular inward extension 200 engages the laterally outward portion of the annular extension region 198 and central shaft region 184 flexes radially outwardly as indicated in FIG. 16 to get into this position as indicated in FIG. 17. In this orientation, the J-member 26 can reposition vertically as indicated in FIGS. 18 and 19 to remove or insert a fishing rod.

Figure 6:
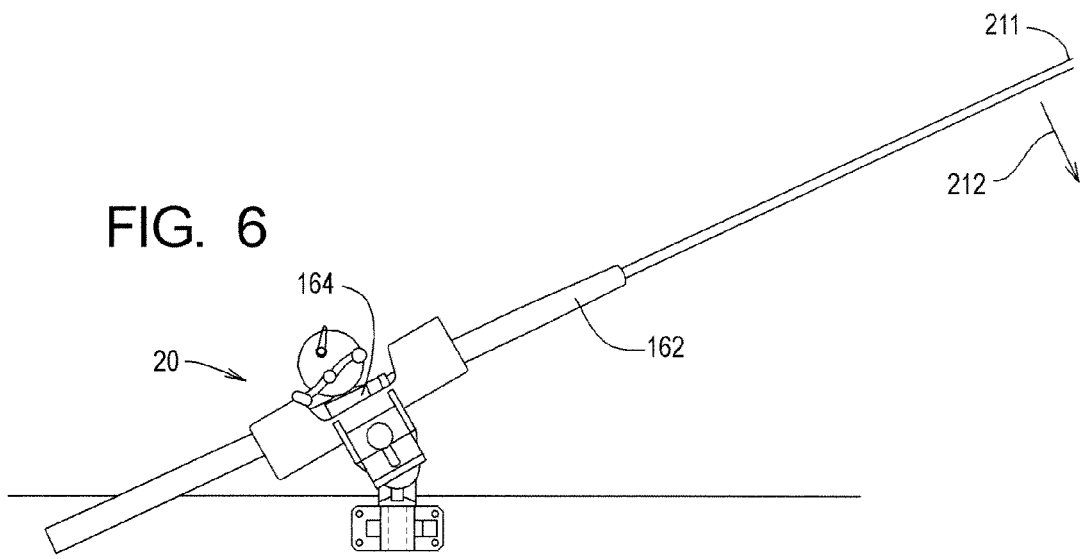
FIG. 6 shows the fishing rod within the fishing rod retention assembly, where the right-hand portion simulates the pull movement exerted thereon the fishing rod from the catch of a fish where the fishing rod is securely positioned in the rod retention conduit formed by the retention member and the J-member.
Figure 19:
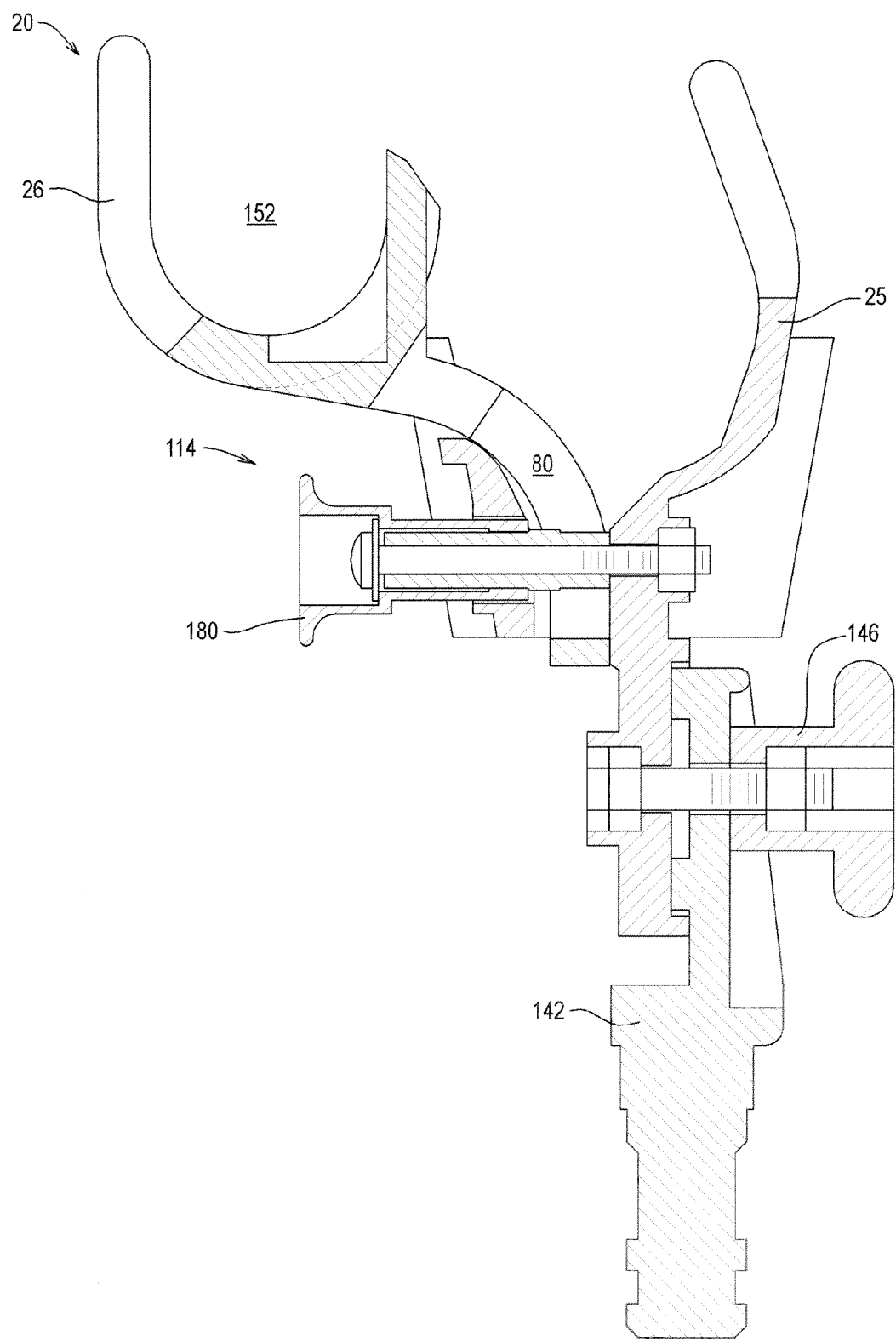
FIG. 19 shows the J-member of the fishing rod retention assembly in a fully open position.
Figure 20:
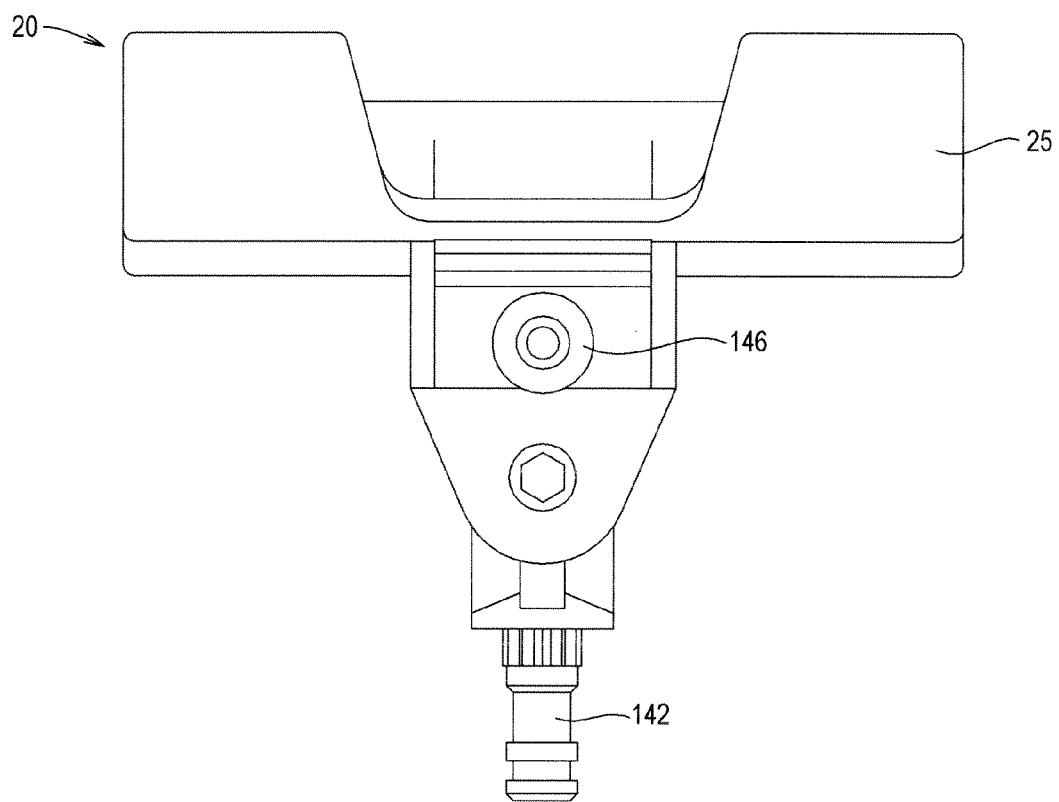
FIG. 20 is a side view of the fishing rod retention assembly.

As indicated in FIG. 7, as the fisherman provides the partially vertical force as indicated at 210, while the retainer 180 is retracted as indicated in FIGS. 17-19, the fishing rod is removable by grasping the forward handle region 168 and pulling upwardly; however, a downward force as indicated in FIG. 6 by vector 212 at the forward region 211 of the fishing rod, forces the fishing rod 162 to remain locked within the fishing rod retention assembly 20.

Referring to FIG. 22, the mount extension 88 in one form is fixedly attached to the J-member receiving portion 86 and the mount extension 88 is adjustably attached to a base mounting 140 as shown in FIG. 16. In one form, the base mounting 140 is attached to the mount extension 88 by an adjustable attachment device 146. The base mounting 140, having a lower portion 142 that is adapted to be mounted in standard vertical openings generally adapted to receive rod post holders on boats or stationary platforms for fishing, is indicated in FIG. 2 or for a display of a fishing rod in some manner.

Figure 10:
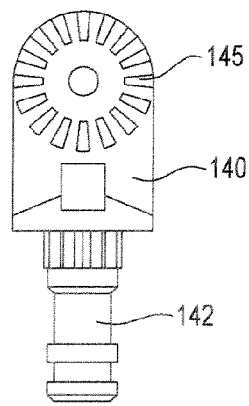
FIG. 10 shows a side view of a base mount that is adapted to be positioned on a boat or other fishing location such as the dock on the shoreline.
Figure 11:
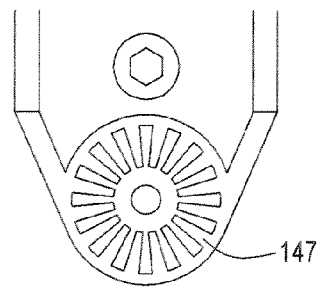
FIG. 11 shows a mount extension that is fixedly attached to the rod retention system.

The adjustable attachment device 146 is a part of a pitch adjustment system whereas shown in FIG. 16, the adjustment knob 141 is threadedly engaged to the bolt 143 which is fixedly attached to the retention member 25. Therefore, rotating the adjustment knob 141 repositions the knob laterally inwardly and outwardly and as indicated in FIGS. 10 and 11, the locking extensions 145 are adapted to engage the locking grooves 147 to fixedly position the upper assembly 27 in a certain pitch orientation. As indicated in FIG. 9, the base mounting 140 can be orientated at various angles with respect to the upper assembly 27.

There will now be a discussion of one form of operating the fishing rod retention assembly 20 with initial reference to FIG. 2. As shown in this figure, the fishing rod retention assembly is attached to a boat or stationary platform 160. The boat or stationary platform 160 is defined broadly as a mounting location which in one form is a moving frame of reference such as a boat where the fishing rod is desired to be positioned in an active fishing orientation without the fisherman having to hold onto the fishing rod constantly. Alternatively, the fishing rod retention assembly can be mounted to a stationary platform such as a pier, whereby the fisherman does not need to hold the fishing rod 162, but rather, desires a rod retention assembly 20 to provide quick access to the fishing rod 162 when a fish takes the bait off of the fishing rod's line. Of course, the fishing rod retention assembly 20 can function in other environments such as a display type of arrangement in a retail store or an individual's home.

FIG. 1 shows a fishing rod 162 having a reel seat area 164 that is generally defined as a portion of the fishing rod grasping area in the area adapted to mount the reel 166 thereto. As shown in FIG. 7, on the opposing side of the reel is an extension 165 which in one form is adapted to engage the pocket 48 as shown in FIG. 1.

FIG. 5 shows a method of inserting the rod 162 into the fishing rod retention assembly 20, whereby the fishing rod retention assembly 20 is in an open position and the rod retention conduit 152 is in an open exposed orientation, and the reel seat area 164 is adapted to engage the rotating retention surface 36 of the upper and lower retention members 32 and 34. The rotating retention surface 36 is adapted to engage the outer cylindrical surface of the reel seat area 164 (see FIG. 2) whereby the cross-sectional diameter of the partially cylindrical-like portions of the rotating retention surface 36 is slightly greater than the diameter of the conical or partially frustoconical surface of the handle region of the fishing rod 162.

As shown in FIG. 5 the reel seat area 164 is positioned into the open chamber region of the rotating retention surface 36 of the J-member 26. The reel 166 is adapted to be interposed between the members 35 and 37 of the upper retention extension 32 as seen in FIG. 2. As shown in FIG. 7, the fisherman can place the fishing rod 162 into the exposed rod retention conduit 152 and thereafter place a downward and laterally inward force to reposition the J-member 26 in the direction. Thereafter, the fishing rod retention assembly 20 is in a closed position as shown in FIG. 3 as well as FIG. 2, whereby the fishing rod 160 is locked therein the rod retention conduit 152.

When the fisherman has a take on the line and a fish is taking the bait, the pull upon the rod creates a movement about a lateral axis that is transferred to the J-member 26. This movement is counteracted in part by the interaction between the engaging surfaces 74 and 106 as well as 76 and 104 (see FIG. 1). The interaction between the immediately aforementioned surfaces creates a frictional type engagement that aids in the prevention of an upward and laterally outward direction opposite to that of arrow 212 in FIG. 6. However, as the fisherman grasps the forward handle region 168 and the rearward handle region 169 of the fishing pole 162 (see FIG. 7) and supplies a vertical force indicated by arrow 210, the frictional forces between surfaces 104 and 76 as well as the engaged surfaces 74 and 106 (see FIG. 2) are reduced and the fisherman counteracts the resistance of the rod locking mechanism 114 to reposition the J-member into an open position as shown in FIG. 7.

There will now be a brief discussion of the frictional engagement points with reference to FIGS. 21 and 22. In general, the area that extends longitudinally indicated at 300 in FIG. 21 which is positioned in the upper portion of the J-member is adapted to rest on the upper portion 301 (see FIG. 22) of the first lateral surface 108 when in the closed position. Further, a portion of the curve surface 62 indicated at 304 is adapted to engage the lower region of the surface 110 generally indicated at the position 306 in FIG. 22. Further, the outside cylindrical-like diameter area 310 as shown in FIG. 21 is adapted to rest within the cup area 312 as shown in FIG. 22 when in the closed position. The arrangement of the J-member provides for a unique action with tremendous ease of retrieving the fishing pole and providing the fisherman with a sense of security when the J-member is in a locked position with respect to the retention member.

Of course various modifications and alterations can be performed upon the fishing rod retention assembly without departing from the spirit and scope of the claimed invention.

I claim:

1. A fishing rod retention assembly having a longitudinal axis and a lateral axis and adapted to be attached to a stationary platform or a boat and mount a reel seat area of a fishing rod therein, the fishing rod having a forward region that occasionally has a load exerted thereon such as the load exerted from a fish on the line of the fishing rod, the fishing rod retention member comprising:
   a. a retention member adapted to be adjustably attached to the stationary platform or boat and comprising a longitudinally forward and a rearward surface that partially defines a receiving slot,
   b. a J-member comprising:
      i. a retention bracket comprising a lower retention member and an upper retention member and having a central elongated chamber region adapted to mount the reel seat area of a fishing rod therein,
      ii. a curve attachment fixedly attached to the retention bracket, the curved attachment having a longitudinally rearward surface and a longitudinally forward surface, first and second surfaces that are curved about a longitudinal axis, the center of curvature of the first and second surfaces arranged to have center of curvatures in a first lateral area of the curve attachment,
   c. a locking mechanism is adapted to restrict movement of the J-member with respect to the retention member,
   d. whereas the J-member is adapted to be positioned in the receiving slot of the retention member and have an open position whereby the elongated chamber region provides for access therein, and the J-member is adapted to be repositioned downwardly and laterally with the curve attachment extending through the receiving slot in a closed position to retain a fishing rod therein whereby a frictional force between either the longitudinally rearward surface or the longitudinally forward surface of the curve attachment with the longitudinally forward and rearward surfaces of the retention member sufficiently locks the fishing rod therein when a load is placed on the forward portion of the fishing rod, and
   e. whereby the J-member defines an adjustment slot and the locking member comprises a contracting mechanism that is slidably attached to the retention member and adapted to extend through the adjustment slot.

2. The fishing rod retention member as recited in claim 1 whereby the retention member is connected to a base mount by a slot and key means and the base mount is fixedly attached to the stationary platform or boat.

3. The fishing rod retention assembly as recited in claim 1 whereby the J-member has a surface comprising a pocket that is adapted to have an extension in the reel seat area of the fishing rod extend therein.

4. The fishing rod retention assembly as recited in claim 2 whereby the contracting mechanism that is slidably attached to the retention member and is configured to remain in engagement with the curve attachment.

5. The fishing rod retention assembly as recited in claim 1 whereby an upper portion of the surface defining the adjustment slot defines an open region that has sufficient longitudinal width to allow the contracting mechanism to freely pass therethrough.

6. The fishing rod retention assembly as recited in claim 1 whereby the adjustment slot has a longitudinal width that is smaller than the diameter of the contracting mechanism.

7. The fishing rod retention assembly as recited in claim 1 whereby the retention member comprises a mount extension that is rotatably and fixedly attached to a mount extension that is fixedly attached to a boat or stationary object.

8. The fishing rod retention assembly as recited in claim 7 whereby the mount extension comprises a plurality of slots aligned about a centerpoint and the mount extension comprises a plurality of extensions that are adapted to engage the slots of the mount extension and a laterally extending tension member maintains the extensions fixedly attached to the slots.

9. The fishing rod retention assembly as described in claim 8 whereby the laterally extending tension member is adapted to allow rotation thereabout between the mount extension and the base mount whereby the pitch of the retention member is adjusted with respect to the boat or stationary location.

10. The fishing rod retention assembly as recited in claim 1 whereby the curve attachment is adapted to rotate about a virtual point positioned away from the fishing rod retention assembly.

11. The fishing rod retention assembly as recited in claim 1 whereby the first and second surfaces of the J-member have a radius of curvature that is greater than 1.5 inches.

12. The fishing rod retention assembly as recited in claim 1 whereby the retention member and J-member are manufactured by an injection molding process.

13. The fishing rod retention member as recited in claim 1 whereby the contracting mechanism has a laterally inward surface adapted to allow easy extraction in a laterally outward direction.

* * * * *